United States Patent [19] [11] 3,759,243
Masetti [45] Sept. 18, 1973

[54] NUCLEAR FUEL ELEMENT
[75] Inventor: William R. Masetti, Elmsford, N.Y.
[73] Assignee: United Nuclear Corporation, Elmsford, N.Y.
[22] Filed: Mar. 25, 1970
[21] Appl. No.: 22,417

[52] U.S. Cl. .................................. 176/68, 176/79
[51] Int. Cl. ............................................ G21c 3/18
[58] Field of Search .................... 176/67, 68, 87, 79

[56] References Cited
UNITED STATES PATENTS
3,291,698  12/1966  Fortescue .............................. 176/68
3,235,466   2/1966  Williams ............................... 176/68
3,406,094  10/1968  Beisswenger et al. ................ 176/79
3,399,112   8/1968  Dodd ..................................... 176/79

FOREIGN PATENTS OR APPLICATIONS
891,179    7/1960  Great Britain ........................ 176/68

Primary Examiner—Carl D. Quarforth
Assistant Examiner—G. G. Solyst
Attorney—Pennie, Edmonds, Morton, Taylor and Adams

[57] ABSTRACT

A nuclear reactor fuel element in tubular form and closed at both ends has at least one chamber for receiving gaseous fission products through pressure-responsive entrance means, the remainder of the fuel element tube being approximately filled with fissionable material. The pressure within the fueled portion of the element rises quickly to approximately the operating pressure of the reactor in which the fuel element is installed and remains approximately at that pressure throughout the life of the fuel element. This is accomplished by admitting gaseous fission products to the chamber whenever, during the operating life of the element, the pressure rises to the predetermined pressure to which the entrance means is responsive.

6 Claims, 5 Drawing Figures

PATENTED SEP 18 1973　　　　　　　　　　　　3,759,243

INVENTOR
WILLIAM R. MASETTI
BY
Pennie, Edmonds, Morton, Taylor & Adams
ATTORNEYS

INVENTOR
WILLIAM R. MASETTI

NUCLEAR FUEL ELEMENT

BACKGROUND OF THE INVENTION

In conventional nuclear fueled power reactors the fissionable fuel material is distributed among and contained within a large number of individual tubes of cladding material which protect the fuel from the reactor coolant and prevent the release of radioactive fuel and fission products into the coolant stream. During operation of a reactor there is a substantially continuous generation and release of gaseous fission products from the fissionable fuel material. These products may not be released into the coolant stream of the reactor or the atmosphere, for they are dangerously radioactive. In order to contain these gaseous products during the operating life of the fuel element the volume of the tubular cladding is made substantially larger than the volume of the contained fuel to provide a void in which the gaseous products may accumulate. In view of well known design considerations relating to the thickness and total quantity of cladding material it is impractical to design a fuel element that is strong enough to sustain an internal pressure which is greatly in excess of the coolant pressure acting on the exterior of the element. Therefore, the void space must be large enough to accommodate, without excessive pressure, the total quantity of fission gases generated over the life of the fuel element, with the result that the pressure build up is slow and the difference between the internal and external pressures acting on the cladding is relatively great during a substantial part of the operating life. The same and similar design considerations limiting the thickness and strength of the cladding make the cladding susceptible to deformation under high pressure differentials, including a tendency of the cladding to collapse onto the fuel material. This and other deformations of the cladding, known collectively as "creep," combined with thermally induced relative motion between the fuel and cladding frequently result in destructive abrasion of the cladding by "ratcheting" between the cladding and fuel, and in punctures and ruptures of the cladding walls at places where fragments of fuel are trapped between the cladding and a fuel pellet.

Most of these damaging effects are due to the relatively large pressure differentials across the cladding walls which persist during a substantial part of the life of the fuel element because the necessarily large volume of the void for receiving fission gases limits the rate at which the internal pressure increases.

SUMMARY OF THE INVENTION

The present invention aims to produce a rapid build-up of the internal pressure within the fuel rod by accumulating the fission gases in a relatively small void space in and around the fuel materials, thereby minimizing the pressure differential across the cladding early in the operating life of the fuel element and preventing the effects of "creep." According to the invention at least one chamber is provided within the fuel rod into which gaseous fission products may be bled off from the void space in and around the fuel material after the pressure has built up to some predetermined value. The admission of gases to such chamber is controlled by pressure responsive means such, for example, as a pressure responsive valve, which is advantageously set at, or slightly below, the operating pressure of the coolant in the reactor in which the fuel rod is used.

With the pressure responsive means closed the normal production of fission gases within the fuel rod will produce a rapid increase in the pressure within the relatively small volume of the space in and around the fuel material. However, upon reaching a predetermined value, such as the setting of the pressure responsive means, the fission gases will commence to enter such chamber, and the pressure within the fuel rod will be held reasonably constant throughout the fuel rod life.

DESCRIPTION OF THE PREFERRED EMBODIMENTS

Figure 1:
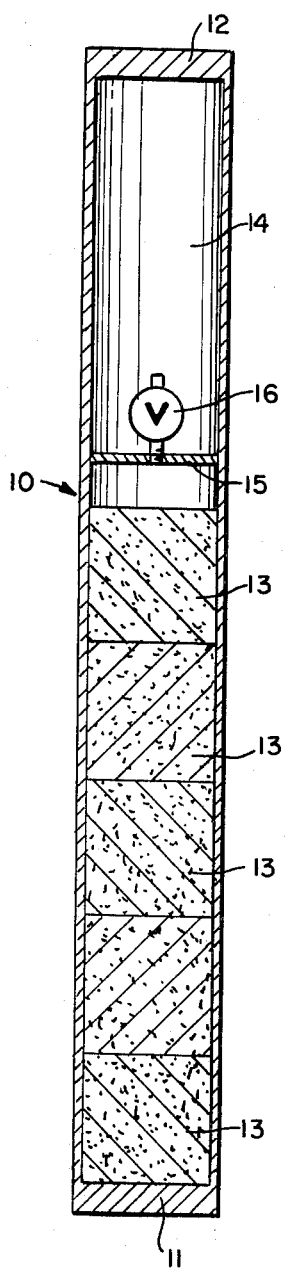
FIG. 1 is a view in vertical transverse section of a fuel rod according to the invention.

Referring first to FIG. 1 there is shown a fuel element or rod 10 which is a cylindrical member made of suitable metallic cladding material such as stainless steel or a zirconium alloy. This tube is closed at its lower end with a cap 11 and at its upper end with a cap 12, both of which are integrally joined to the cylindrical wall of the tube, as by welding. The lower portion of fuel rod or tube 10 contains the fissile fuel which, for purposes of illustration, consists of any suitable number of conventional pellets 13 of uranium oxide or uranium carbide. In accordance with known design considerations there are small clearances between the fuel pellets and the walls of the fuel cladding and, as illustrated in FIG. 1, a small void may be provided between a disc 15 (described below) and the uppermost pellet 13 where fission gases may accumulate.

In an upper portion of the tubular cladding in which there is no fuel pellet there is formed a fission gas receiving chamber 14 by means of a transverse wall 15 in the form of a disc of the cladding material. The edges of disc 15 are arranged to fit the interior surface of the wall of tube 10 so as to provide a joint which is impenetrable by the fission gases produced by the fuel pellets 13 during the operation of the reactor.

A pressure responsive device such as a pressure relief valve 16 is mounted in disc 15. This serves to admit the fission gases from the fueled section of cladding tube 10 into chamber 14. Valve 16 is adjusted to open at, or slightly below, the operating pressure of the reactor which may be as much as several hundred atmospheres.

The internal pressure within chamber 14 at the initial installation of tube 10 in the reactor may be approximately one atmosphere. At the beginning of operation of the fuel element the production of fission gas by the fission of fuel pellets 13 is restricted to the comparatively small volume in and around the fuel pellets, and the pressure within the fueled region will build up rapidly. As soon as the fission gas pressure rises to or slightly above the setting of valve 16, the valve will open and permit the gas to bleed through the pressure relief valve into chamber 14. Thus, the pressure within the fueled section of the element will be held substantially constant, and the internal pressure within chamber 14 will gradually build up until, at the end of the fuel rod life, it will, as a maximum, equal the pressure in the lower section of the fuel rod.

Figure 2:
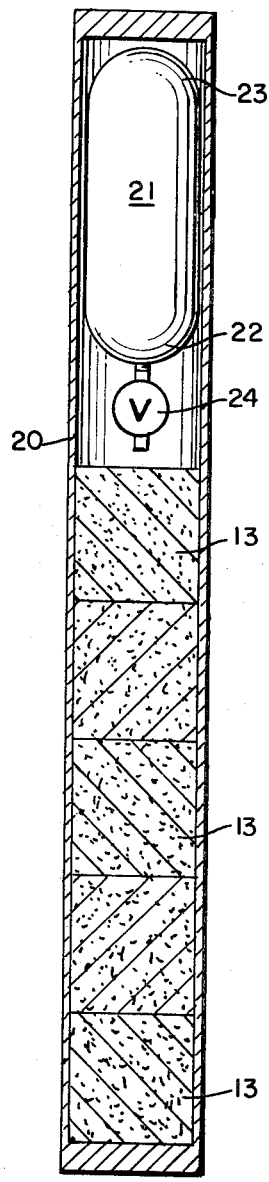
FIG. 2 is a view similar to FIG. 1 showing another form of fuel rod.

Referring now to FIG. 2 the construction of fuel rod 20 is similar to that of fuel rod 10 except that, instead of chamber 14, the upper portion of fuel rod 20 contains a cartridge or envelope 21 which is advantageously made of the same material as the fuel cladding. Cartridge 21 is a cylindrical body having semi-spherical end portions 22 and 23. This construction enables the cartridge to be made of relatively thin material and yet withstand the pressure differential between the outside and the interior of the cartridge.

Like chamber 14, cartridge 21 is provided with a pressure responsive valve 24. This admits the fission gases produced in the fueled section of fuel rod 20 to the interior of cartridge 21 during the life of the fuel rod as described previously in connection with fuel rod 10.

Figure 4:
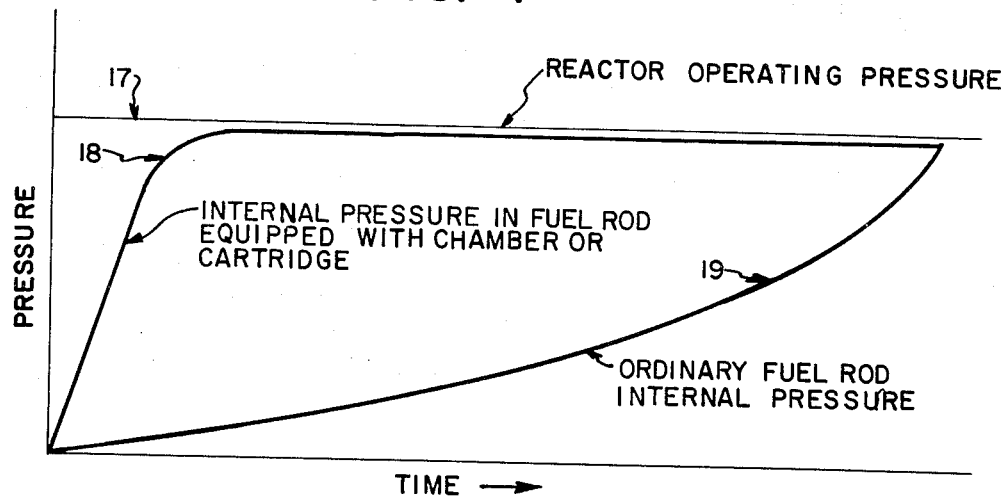
FIG. 4 is a graph comparing the build-up of the internal pressure in an ordinary fuel rod with that in a fuel rod equipped with a chamber or cartridge as shown in FIGS. 1 and 2.

FIG. 4 illustrates the changes in the pressure conditions during the life of a fuel rod having either a chamber 14 or a cartridge 21. The operating pressure of the reactor is approximately constant and is indicated by the horizontal line 17. The abrupt rise and thereafter constant value of the internal pressure within the lower section of the fuel rod is indicated by the curve 18. For comparison the slow rise of the pressure within a conventional fuel rod is shown by curve 19. From an inspection of FIG. 4 it will be seen that the pressure differential between the exterior and the interior of an ordinary fuel rod is quite substantial during all but the last stages of the operating life of the fuel element, it being represented by the vertical difference between curves 17 and 19. On the other hand, the pressure differential in the case of either the fuel rod 10 or fuel rod 20 of the invention is extremely small during all but the initial stages of operation. This is indicated by the vertical difference between the curves 17 and 18.

Figure 3:
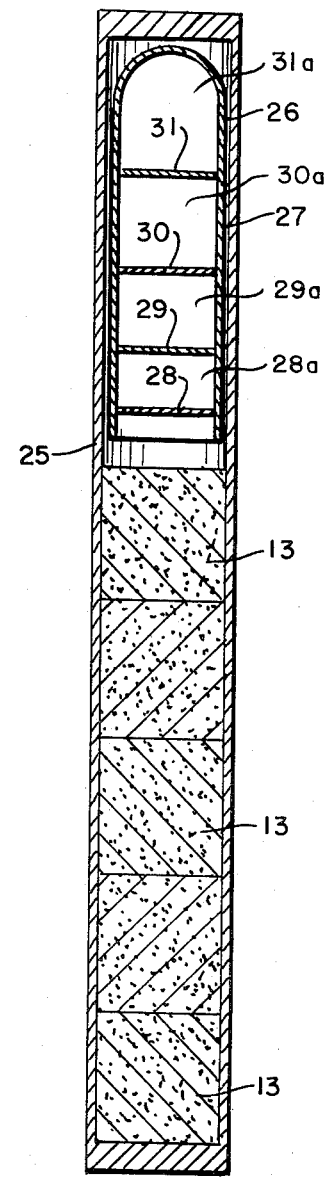
FIG. 3 is a view similar to FIG. 1 of a further modification.

Now referring to FIG. 3 fuel rod 25 is arranged with fuel pellets 13 in its lower portion, and its upper portion is provided with a container that is subdivided into a series of chambers in tandem for receiving the fission gas products. This container is in the form of a cartridge 26 having a semi-spherical upper end 27 and an open cylindrical lower end. This cartridge may also be made of zirconium or a zirconium alloy. It features a series of rupture discs 28, 29, 30 and 31 at spaced locations along the axis of the cylinder to define chambers 28a, 29a, 30a and 31a, respectively of about uniform volume. These discs are fixed within the interior walls of cartridge 26 and are constructed to rupture at some predetermined pressure, such as the operating pressure of the reactor coolant.

Thus, shortly after the initial operation of fuel element 25 the first or lowermost disc 28 will rupture and increase somewhat i.e., by a predetermined amount the volume of cartridge 26 for the accommodation of fission gas products from the pellets 13. The initial rise in internal pressure of the fuel rod is indicated at 32 in the graph shown in FIG. 5. When disc 28 breaks this pressure immediately drops as indicated by the curve portion 33. Thereupon the internal pressure again builds up somewhat according to section 34 of the curve. When the pressure again rises to approximately the reactor operating pressure rupture disc 29 breaks, thus connecting a still larger portion of the volume of cartridge 26 with the fueled portion of fuel rod 25 and again reducing the internal pressure. This is repeated as the discs 30 and 31 rupture in sequence, and is indicated by the stepped curve 18a of FIG. 5. The total volume of the several chambers is designed to accommodate all the gaseous fission products generated during the operating life of the fuel element at or below the operating pressure of the reactor coolant.

Figure 5:
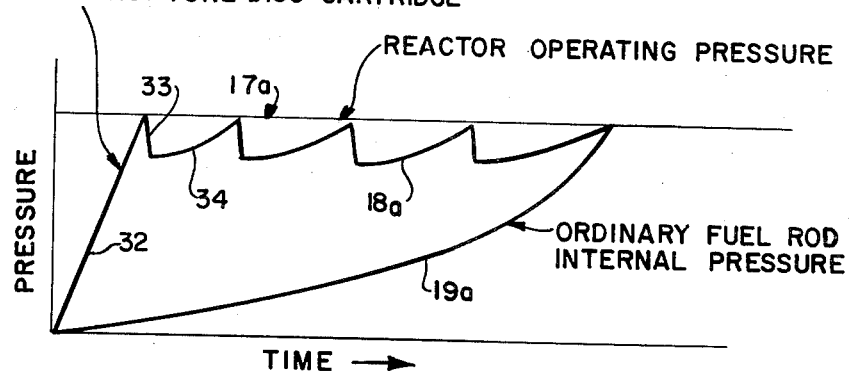
FIG. 5 is a graph comparing the build-up of internal pressure in an ordinary fuel rod with that in a fuel rod equipped with the rupture disc device of FIG. 3.

From FIG. 5 it will be understood that the internal pressure rises quickly when the fuel rod is placed in service and that the pressure differential between the exterior and the interior of the fuel rod 25 is indicated by the vertical difference between the reactor operating pressure curve 17a and the internal pressure of the fuel rod which is indicated by the stepped curve 18a.

I claim:

1. In a nuclear reactor having a predetermined operating pressure and including
   a. a fuel element comprising a tubular cladding member having walls providing a first closed fuel chamber constructed and arranged to contain fissile fuel and fission gases under pressure,
   the improvement in combination therewith comprising:
   b. a second closed chamber within said cladding member separate from said first closed fuel chamber, and
   c. admitting means responsive to said fission gas pressure in said first closed fuel chamber for admitting said gases into said second closed chamber only when said fission gas pressure has risen to approximately the operating pressure of said nuclear reactor, wherein said closed fuel chamber includes a void space proximate said admitting means and said void space having a substantially smaller volume than the volume of the fissile fuel for permitting a rapid build up of pressure within said chamber, said pressure responsive means and said second closed chamber causing the pressure within said fuel chamber to remain approximately at said operating pressure throughout the life of said fuel element.

2. A nuclear reactor fuel element according to claim 1 in which is located between said second closed chamber and said fuel chamber a valve member for admitting fission gas from said fuel chamber to said second closed chamber, said valve member being constructed to open in response to a pressure in said fission gas chamber at or sightly below the operating pressure of said reactor.

3. A nuclear reactor fuel element according to claim 1 in which said second closed chamber is a closed member within said cladding member and having walls independent of the walls of said cladding member.

4. A nuclear reactor fuel element according to claim 1 in which said second closed chamber includes a series of spaced frangible discs forming a series of closed chambers of about uniform volume, each of said discs being constructed to break at a fission gas pressure at or slightly below the operating pressure of said reactor, thus repeatedly increasing by a predetermined amount the volume of said second closed chamber throughout the life of the fuel element.

5. A nuclear fuel element according to claim 2 in which said second closed chamber is a closed member within said cladding member and having walls independent of the walls of said cladding member.

6. A nuclear reactor fuel element according to claim 2 in which said second closed chamber includes a series of spaced frangible discs forming a series of closed chambers of about uniform volume, each of said discs being constructed to break at a fission gas pressure at or slightly below the operating pressure of said reactor, thus repeatedly increasing by a predetermined amount the volume of said second chamber closed throughout the life of the fuel element.

* * * * *